United States Patent [19]

Konon

[11] Patent Number: 4,883,589

[45] Date of Patent: Nov. 28, 1989

[54] SYSTEM FOR REMOVING CONTAMINANTS FROM GROUND WATER

[75] Inventor: Walter Konon, Waccabuc, N.Y.

[73] Assignee: New Jersey Institute of Technology, N.J.

[21] Appl. No.: 194,801

[22] Filed: May 17, 1988

[51] Int. Cl.$^4$ .............................................. B01D 35/02
[52] U.S. Cl. .................................... 210/140; 210/170; 210/286; 210/502.1
[58] Field of Search ................. 210/170, 747, 901, 88, 210/98, 167, 258, 317, 484, 502.1, 505, 532.2, 694, 800, 805, 163; 405/36, 128, 129, 51, 53, 50; 166/53, 64, 66, 325, 326; 134/14, 22.1, 40, 42; 417/118, 145

[56] References Cited

U.S. PATENT DOCUMENTS

| | | | |
|---|---|---|---|
| 4,165 | 10/1870 | Dewey et al. ....................... | 210/170 |
| 4,582,611 | 4/1986 | Wang .................................. | 210/747 |
| 4,639,165 | 1/1987 | Flecknoe-Brown ................ | 210/170 |
| 4,678,040 | 7/1987 | McLaughlin et al. ............... | 166/53 |
| 4,802,829 | 2/1989 | Miller .................................. | 417/118 |

Primary Examiner—Richard V. Fisher
Assistant Examiner—Joseph Drodge
Attorney, Agent, or Firm—Klauber & Jackson

[57] ABSTRACT

A system for removing contaminants from ground water, includes a plurality of tubular members made of a liquid pervious fabric material and having a rigid plastic core therein; a contaminant-absorbing material in each tubular member; an anchor cap secured to a lower end of each tubular member for preventing the contaminant-absorbing material from escaping from the lower end; a conduit positioned in each tubular member for supplying compressed air to each tubular member, the conduit having a lower, open end spaced above the lower end of each respective tubular member; and an air compressor for supplying the compressed air to each conduit.

28 Claims, 2 Drawing Sheets

SYSTEM FOR REMOVING CONTAMINANTS FROM GROUND WATER

BACKGROUND OF THE INVENTION

This invention relates generally to ground water cleaning systems and, more particularly, is directed to a system for removing contaminants from ground water with modified ground water drain wicks.

Of great importance today is the cleaning up of hazardous waste sites. Such sites are often created when hazardous chemicals and the like leak from dump sites at which the hazardous chemicals were deposited or from areas where they were spilled accidentally. As a result, the chemicals seep into the underlying soil and reach the ground water table, thereby contaminating the same.

Conventionally, in order to clean up such hazardous waste sites, the contaminated soil had to be completely removed and then either treated or transported to another site. This has proved to be extremely costly and time-consuming.

More recently, in U.S. Pat. No. 4,582,611 to Wang, it has been suggested to use conventional drain wicks at the contaminated site. In such case, water is injected into a plurality of the drain wicks, and the water and contaminants are removed from the remaining drain wicks, whereupon the removed water and contaminants are supplied to a separate treatment center. However, with this system, the water which leaves the entry wicks (so as to push the contaminants out of the exit wicks), also pushes the polluted or contaminated soil water further out of the contaminated area, thereby increasing the area of contamination and adds to the total volume of water to be treated. Since the cost of treatment of a contaminated site is a function of its area and volume, and since the Wang system increases the volume and area over which the contaminated water is spread, the cost of treatment with this system is increased.

U.S. Pat. No. 4,625,807 to Harlow discloses a method and apparatus for recovery of water-immiscible liquids from water-bearing formations. Harlow is designed to removed hydrocarbons on top of a layer of water, and is only operational with non-miscible pollutants that sit on the surface of a water layer. In other words, Harlow performs a skimming operation, and is particularly applicable to gasoline spills. In Harlow, a container is inserted in the ground. A compressed air line feeds the vessel to purge its interior of accumulated liquid through an exit port on an intermittent basis. Harlow uses check valves with each port and uses a system including a water pump for lowering the water level in the well such that the pollutants on the surface of the water fall into the canister or container for removal.

U.S. Pat. No. 4,625,801 to McLaughlin et al., discloses a method and apparatus for recovering hydrocarbon that accumulates on the underground water tables and is similar to Harlow with the exception that McLaughlin et al., also can remove the water with the hydrocarbon for surface treatment. Both Harlow and McLaughlin et al., require the pumping of water to form a cone of depression and then collect the non-miscible pollutants on top of the water layer and remove the material for treatment at the surface.

U.S. Pat. No. 415,927 to Stiles discloses a hand-operated suction pump that can only raise water from a level of 15-18 feet below the soil's surface. The suction pump is a conventional vacuum pump used in wells. Air is pumped into the water but is only used to aerate the water and merely bubbles through the water in the activated carbon and does not serve to lift the water to the surface.

U.S. Pat. No. 753,780 to Woods discloses a similar arrangement to Stiles and, like Stiles, is intended to be placed in well water away from the soil to obtain potable water. If Stiles or Woods were placed directly in soil, the apparatus thereof would clog up with the soil and be inoperable.

Drain wicks are conventional structures that are used in soil to remove water therefrom. Accordingly, such drain wicks are used to accelerate consolidation of soil and to increase the strength of the soil. Specifically, drain wicks shorten the distance of travel of the water through the soil and provide the water with an easy escape route. Such drain wicks conventionally include a liquid pervious fabric exterior and a solid plastic or corrugated paper core used to retain the shape of the drain wick. Examples of conventional drain wicks are those sold by Burcan Industries, 111 Industrial Drive, Whitby, Ontario, Canada, under the marks "ALIDRAIN" AND "HITEK 8 FLOWDRAIN" and by American Wick Drain Corp., 301 Warehouse Drive, Matthews, N.C., under the mark "AMERDRAIN".

OBJECTS AND SUMMARY OF THE INVENTION

Accordingly, it is an object of the present invention to provide a system for removing contaminants from ground water that avoids the aforementioned problems with the prior art.

More particularly, it is an object of the present invention to provide a system for removing contaminants from ground water with modified drain wicks.

It is another object of the present invention to provide a system for removing contaminants from ground water which decreases the contaminated area during removal of the contaminants therefrom and does not introduce additional ground water into the system which would increase the overall volume of water to be treated.

It is another objective of the present invention to remove the ground water contaminants at their sub-surface locations without the need for pumping to surface treatment facilities.

It is still another object of the present invention to provide a system for removing contaminants from ground water in which the cost of treatment is greatly reduced due to the reduced volume and area needed to remove the contaminants.

It is yet another object of the present invention to provide a system for removing contaminants from ground water in which the drain wicks can remain in the ground after the contamination removing operation has been completed and can be removed at a later time.

It is a further object of the present invention to provide a system for removing contaminants from ground water that can be used with miscible, non-miscible, organic and non-organic volatile and non-volatile contaminants.

It is a still further object of the present invention to provide a system for removing contaminants that is particularly useful in poorly draining soils.

It is another object of the present invention to provide a system for removing contaminants from ground water that is easy and inexpensive to construct and use.

In accordance with an aspect of the present invention, apparatus for removing contaminants from ground water includes at least one tubular member made of a liquid pervious material; cap means secured to a lower end of each tubular member; and conduit means positioned in each tubular member for supplying a pressurized fluid to each tubular member, the conduit means having a lower, open end spaced above the lower end of each respective tubular member.

In accordance with another aspect of the present invention, a system for removing contaminants from ground water includes a plurality of tubular member made of a liquid pervious material; cap means secured to a lower end of each tubular member; conduit means positioned in each tubular member for supplying a pressurized fluid to each tubular member, the conduit means having a lower, open end spaced above the lower end of each respective tubular member; and a source of the pressurized fluid supplied to the conduit means for supplying the compressed gas thereto. The above and other objects, features and advantages of the present invention will become readily apparent from the following detailed description thereof which is to be read in conjunction with the accompanying drawings.

DETAILED DESCRIPTION OF A PREFERRED EMBODIMENT

Figure 1:
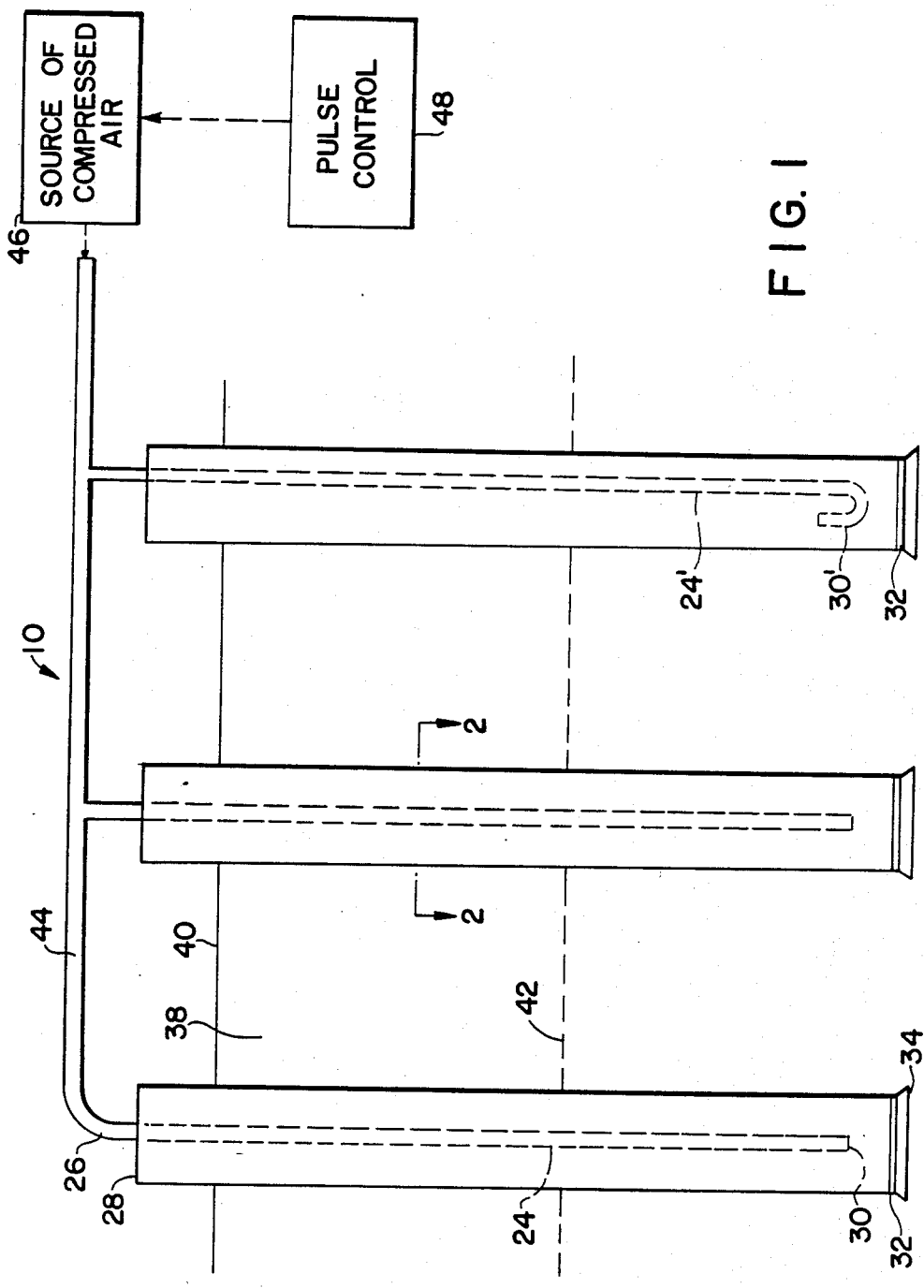
FIG. 1 is a schematic side elevational view of a system for removing contaminants from ground water according to the present invention.
Figure 2:
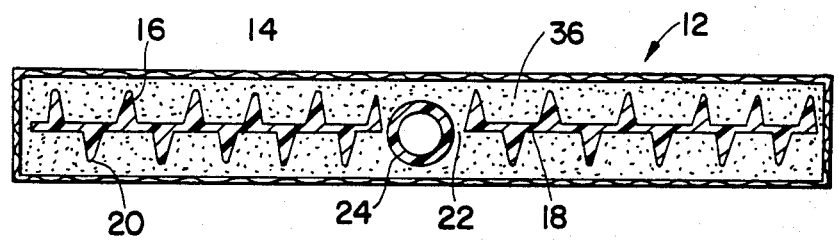
FIG. 2 is a cross-sectional view of one of the modified drain wicks according to the present invention, taken along line 2—2 of FIG. 1.

Referring to the drawings in detail, a system 10 for removing contaminants from ground water will now be described.

In particular, the present invention uses a modified drain wick 12 which includes an outer filter fabric 14 that is liquid pervious so that contaminated ground water can enter modified drain wick 12. Filter fabric 14 may have reinforcing strands added to the material thereof to enable removal (pulling out) of modified drain wicks 12 from the ground at the end of the contaminant-removal operation. Modified drain wick 12 further includes a rigid core 16 within outer fabric 14 for retaining the shape of outer fabric 14 and preventing the collapse thereof. According to one example, rigid core 16 is made of a rigid plastic material and is formed as a planar sheet 18 having a plurality of studs 20 extending from the outer planar surfaces thereof so as to retain outer fabric 14 in a substantially rectangular or oval cross-sectional configuration. As thus far discussed, modified drain wick 12 is substantially identical to conventional drain wicks.

In accordance with the present invention, rigid core 16 is split along a longitudinal center area 22 thereof, and a hollow tube or conduit 24 is positioned therein such that the upper end 26 of hollow tube 24 extends out of the upper end 28 of outer fabric 14, and the lower end 30 of hollow tube 24 is spaced upwardly from the lower end 32 of outer fabric 14, as best shown in FIG. 1, by a distance in the range of approximately 3 inches to 9 inches.

The lower end 32 of outer fabric 14 is closed, for example, by an anchor clip or cap 34.

A contaminant removing material 36 is provided within the framework of outer filter fabric 14 and fills the void therein. As an example, the contaminant removing material can be activated carbon for removing chlorinated hydrocarbons and aromatics such as benzene, toluene and other organic materials; ion exchange resins for removing heavy metal ions; fly ash and the like. The sorbent material 36 that is used will depend on the specific ground water contaminant to be removed. Cap 34 prevents escape of contaminant removing material 36 from the lower end of hollow tube 24.

Figure 3:
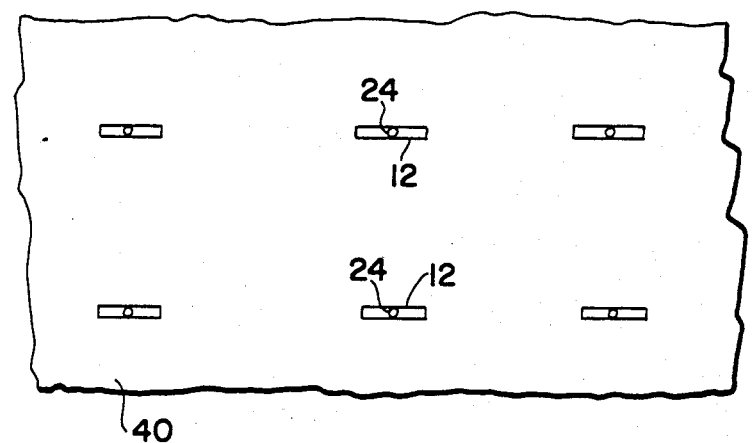
FIG. 3 is a top plan view of the system of FIG. 1, without the source of compressed air attached to the modified drain wicks.

A plurality of modified drain wicks 12 are positioned in spaced relationship, as shown in FIGS. 1 and 3, in the contaminated soil 38 such that the upper ends 28 of modified drain wicks 12 extend above the upper surface 40 of soil 38 and such that the modified drain wicks 12 extend to a level below the water table level 42. The spacing of the modified drain wicks 12 at a particular site will be dependent upon the soil permeability, although anticipated spacings range from 3 to 30 foot centers. The modified drain wicks 12 according to the present invention will ideally extend to a depth of 60 to 80 feet, but can extend to other depths as much as 150 feet or more.

The upper ends 26 of hollow tubes 24 are connected to a supply conduit 44 which, in turn, is connected with a source 46 of a compressed gas, such as air.

In operation, compressed air is supplied through supply conduit 44 to hollow tubes 24 where the compressed air exits from the lower ends 30 of hollow tubes 24. Because there is less resistance to the air rising out of the upper open ends 28 of modified drain wicks 12, the air will be pushed upwardly which, in turn, will force the water that has entered modified drain wicks 12 through the pervious outer fabric 14, to flow upwardly through the sorbent material. With increased air pressures the water can also be pushed out through the open upper ends 28 of modified drains wicks 12. The water that is forced out of upper open ends 28 then falls back through the soil 38.

The produced water (after treatment) may also be removed from the site to a surface water system or sewage treatment system. This minimizes the amount of water which must be treated. Therefore, not allowing the treated water to reenter the ground near the same site would be an advantage. In addition, it is envisioned that contaminant removing material 36 can be eliminated. In such case, the water would be removed by the compressed air to a surface water treatment system.

In order to ensure that the compressed air through hollow tube 24 does not exit through the lower end 32 of modified drains wicks 12, lower ends 30 of hollow tubes 24 are spaced 3 to 9 inches, and preferably 6 to 8 inches from lower end 32 of modified drain wicks 12. Alternatively, as shown in FIG. 1, as modified hollow tube 24' can be provided which is identical to hollow tube 24 with the exception that hollow tube 24' has its lower end 30' in a J-shape such that the open end thereof is facing upwardly to force the compressed air upwardly. With this arrangement, the lower end 30' of hollow tube 24' can be placed closer to the lower end 32 of modified drain wick 12.

As the water in each drain wick 12 is pushed upwardly, it passes through the contaminant removing material 36 therein so as to remove the contaminants from the water. Therefore, the water that travels through each drain wick 12 has had its contaminants removed. This process continues until the water in soil 38 has been fully treated to remove the contaminants therefrom.

The present invention can be used with a constant source of compressed air 46 as discussed above. Alternatively, the compressed air from source 46 can be supplied intermittently, for example, in five-minute intervals to permit new contaminated water to enter modified drains wicks 12 after the water therein has been treated and evacuated. In this regard, a pulse control 48, as shown in FIG. 1, can be connected to source 46 of compressed air so as to control the latter to intermittently supply compressed air to modified drain wicks 12.

Further, with the present invention, although it has been described that the treated water rises up through the modified drain wick 12 or at increased pressures exits the open upper end 28 of each modified drain wick 12, the present invention can be operated in another mode. Specifically, the air pressure from source 46 may be decreased to such an extent that the water within each drain wick 12 does not rise significantly in elevation nor does it exit the upper open end 28 thereof. In other words, the air pressure may be greatly reduced. In such case, the air pressure will be sufficient to force volatile contaminants up through the sorbent material core and out of the upper end 28 of modified drain wicks 12, whereupon the volatiles are treated as they travel up the air filled core. In such case, the air pressure can be greatly reduced.

Modified drain wicks 12 according to the present invention can be installed in the same manner as conventional drain wicks, for example, as taught by Wang in U.S. Pat. No. 4,582,611. For example, after hollow tube 24 is placed in each drain wick 12 such that the lower end 30 thereof is spaced 6 to 12 inches from the lower end 32 of outer filter fabric 14, the lower end 32 of outer filter fabric 14 is folded over and secured thereat. The drain wick, as is conventional, is then threaded through and enclosed by a steel mandrel of small cross section and a small steel anchor plate 34 is attached at the bottom of the drain wick. The mandrel is then driven into the soil to the depth required, that is, below the ground water table so as to intercept the contaminated water. The mandrel is then extracted, and the anchor plate 34 retains the modified drain wick 12 in the soil 38. When the mandrel is fully extracted, the drain wick is cut off a few feet above the surface 40 of the ground, and the hollow tube 24 is then connected to a source 46 of compressed air and operated as aforementioned.

Thus, with the present invention, because the contaminated ground water is drawn in through the drain wicks 12, and the compressed air is retained fully within the structure of the modified drain wicks 12, there is no expansion of the contaminated area as in U.S. Pat. No. 4,582,611. As a result, the contaminated area is decreased. Since the cost of treatment is a function of the volume, the number of modified drain wicks 12 according to the present invention can be reduced. In addition, treatment of the ground water is effected inside of the modified drain wicks 12. In addition, the present invention functions with all water contaminated areas, including non-miscible, miscible and organic pollutants.

Having described a specific preferred embodiment of the invention with reference to the accompanying drawings, it will be appreciated that the present invention is not limited to that precise embodiment and that various changes and modifications can be effected therein by one of ordinary skill in the art without departing from the spirit or scope of the invention as defined in appended claims.

What is claimed is:

1. Apparatus for removing contaminants from ground water, comprising:

a tubular member made of a liquid pervious material, said tubular member having an upper end and a closed lower end, and said tubular member inserted in ground containing contaminated water with the ground in surrounding contact therewith;

supply conduit means for supplying a pressurized fluid to the lower end of said tubular member, said conduit means being positioned in said tubular member and having a lower, open end spaced above and adjacent to said lower end of said tubular member with a continuous gap provided between said conduit means and said tubular member which extends from the lower, open end of the conduit means to the upper end of the tubular member to permit the pressurized fluid to travel therein; and a contaminant-removing material in said tubular member.

2. Apparatus according to claim 1; wherein said tubular member is made from a fabric material.

3. Apparatus according to claim 2; wherein said tubular member further includes shape retaining means for retaining said fabric material in a tubular configuration.

4. Apparatus according to claim 3; wherein said shape retaining means includes a substantially rigid core.

5. Apparatus according to claim 4; wherein said rigid core is corrugated.

6. Apparatus according to claim 4; wherein said core is made from a rigid plastic material.

7. Apparatus according to claim 1; wherein said contaminant-removing material is selected from the group consisting of activated carbon, fly ash and ion exchange resins.

8. Apparatus according to claim 1; wherein said conduit means includes a tube in said tubular member, said tub having a lower end spaced from the closed lower end of the tubular member.

9. Apparatus according to claim 8; wherein the lower end of the tube is spaced from the lower end of the tubular member by a distance in a range of approximately 3 inches to 9 inches.

10. Apparatus according to claim 1, further including cap means for closing the lower end of said tubular member.

11. Apparatus according to claim 10; wherein said cap means includes an anchor plate secured to the lower of each said tubular member.

12. Apparatus for removing contaminants from ground water, comprising:

a tubular member made of a liquid pervious material, said tubular member having an upper end and a closed lower end, said tubular member being inserted in ground containing contaminated water with the ground in surrounding contact therewith, said tubular member being made from a fabric material, and said tubular member further includes shape retaining means for retaining said fabric material in a tubular configuration, said shape retaining means includes a substantially rigid core, and said rigid core includes a planar sheet and a plurality of studs extending from opposite surfaces of said planar sheet; and supply conduit means positioned in said tubular member for supplying a pressurized fluid to said tubular member, said conduit means having a lower, open end spaced above said lower end of said tubular member with a continuous gap provided between said conduit means and said tubular member which extends from the lower open end of the conduit means to the upper end of the tubular member to permit the pressurized fluid to travel therein.

13. Apparatus for removing contaminants from ground water, comprising:

a tubular member made of a liquid pervious material, said tubular member having an upper end and a closed lower end, said tubular member being inserted in ground containing contaminated water with the ground in surrounding contact therewith; and supply conduit means positioned in said tubular member for supplying a pressurized fluid to said tubular member, said conduit means having a lower, open end spaced above said lower end of said tubular member with a continuous gap provided between said conduit means and said tubular member which extends from the lower, open end of the conduit means to the upper end of the tubular member to permit the pressurized fluid to travel therein, said conduit means including a tube in said tubular member, the tube having an upturned lower end which forces said pressurized fluid to flow in an upward direction into the tubular member.

14. A system for removing contaminants from ground water, comprising;

a plurality of tubular members made of a liquid pervious material, each tubular member inserted in ground containing contaminated ground water, in spaced relation to each other with the ground in surrounding contact with each tubular member and each tubular member having an upper end and a closed lower end;

conduit means for supplying a pressurized fluid to the lower end of each said tubular member, said conduit means being positioned in each said tubular member and having a lower, open end spaced above and adjacent to said lower end of each respective tubular member with a continuous gap provided between said conduit means and said tubular member which extends from the lower, open end of the conduit means to the upper end of the tubular member to permit the pressurized fluid to travel therein;

a contaminant-removing material in each said tubular member; and a source of the pressurized fluid connected to said conduit means for supplying the pressurized fluid thereto.

15. A system according to claim 14; wherein said pressurized fluid is compressed air, and said source includes an air compressor.

16. A system according to claim 14; further including pulse control means for controlling said source to intermittently supply said pressurized fluid to said conduit means.

17. A system according to claim 14; wherein each said tubular member is made from a fabric material.

18. A system according to claim 17; wherein each said tubular member further includes shape retaining means for retaining said fabric material in a tubular configuration.

19. A system according to claim 18; wherein each said shape retaining means includes a substantially rigid core.

20. A system according to claim 19; wherein each said core is made from a rigid plastic material.

21. A system according to claim 18; wherein each said rigid core is corrugated.

22. A system according to claim 14; wherein said contaminant-removing material is selected from the group consisting of activated carbon, fly ash and ion exchange resins.

23. A system according to claim 14; wherein said conduit means includes a tube in each said tubular member, each tube having a lower end spaced from the closed lower end of the respective tubular member.

24. A system according to claim 23; wherein the lower end of each tube is spaced from the lower end of each respective tubular member by a distance in the range of approximately 3 inches to 9 inches.

25. Apparatus according to claim 14; further including cap means for closing the lower end of each said tubular member.

26. Apparatus according to claim 25; wherein said conduit means includes a tube in each said tubular member; each tube having an upturned lower end which forces said pressurized fluid to flow in an upward direction into the respective tubular member.

27. A system for removing contaminants from ground water, comprising;

a plurality of tubular members made of a liquid pervious material, each tubular member inserted in ground containing contaminated ground water, in spaced relation to each other with the ground in surrounding contact with each tubular member and each tubular member having an upper end and a closed lower end, each tubular member being made from a fabric material and further including shape retaining means for retaining said fabric material in a tubular configuration, each said shape retaining means includes a substantially rigid core, and each said rigid core includes a planar sheet and a plurality of studs extending from opposite surfaces of said planar sheet;

conduit means positioned in each said tubular member for supplying a pressurized fluid to each said tubular member, said conduit means having a lower, open end spaced above said lower end of each respective tubular member with a continuous gap provided between said conduit means and said tubular member which extends from the lower, open end of the conduit means to the upper end of the tubular member to permit the pressurized fluid to travel therein and;

a source of the pressurized fluid connected to said conduit means for supplying the pressurized fluid thereto.

28. A system for removing contaminants from ground water, comprising:

a plurality of tubular members made of a liquid pervious material, each tubular member inserted in ground containing contaminated ground water, in spaced relation to each other with the ground in surrounding contact with each tubular member and each tubular member having an upper end and a closed lower end;
cap means for closing the lower end of each said tubular member, and said cap means includes a plurality of anchor plates, each secured to the lower end of a respective said tubular member;
conduit means positioned in each said tubular member for supplying a pressurized fluid to each said tubular member, said conduit means having a lower, open end spaced above said lower end of each respective tubular member with a continuous gap provided between said conduit means and said tubular member which extends from the lower, open end of the conduit means to the upper end of the tubular member to permit the pressurized fluid to travel therein; and
a source of the pressurized fluid connected to said conduit means for supplying the pressurized fluid thereto.

* * * * *